United States Patent [19]

Josefsson

[11] Patent Number: 4,984,595
[45] Date of Patent: Jan. 15, 1991

[54] CLEANING ARRANGEMENT AND METHOD FOR PAINT SPRAY BOOTH

[75] Inventor: Leif E. B. Josefsson, Sterling Heights, Mich.

[73] Assignee: Flakt, Inc., Madison Heights, Mich.

[21] Appl. No.: 347,508

[22] Filed: May 4, 1989

[51] Int. Cl.$^5$ .............................................. B08B 3/08
[52] U.S. Cl. ........................................ 134/38; 134/3; 134/24
[58] Field of Search ............... 55/DIG. 46; 134/3, 38, 134/24

[56] References Cited

U.S. PATENT DOCUMENTS

| 3,123,455 | 8/1960 | Paasche | 55/228 |
| 3,480,021 | 11/1969 | Ewald | 134/24 |
| 3,954,648 | 5/1976 | Belcak | 252/158 |
| 3,985,922 | 10/1976 | Thornton | 427/345 |
| 4,125,476 | 11/1978 | Dean | 252/115 |
| 4,185,970 | 1/1980 | Dean | 55/89 |
| 4,222,319 | 9/1980 | Donahue | 98/115.2 |
| 4,515,073 | 5/1985 | Dorsch et al. | 98/115.2 |
| 4,537,120 | 8/1985 | Josefsson | 98/115.2 |
| 4,589,925 | 4/1986 | Young | 134/3 |
| 4,726,287 | 2/1988 | Gerdes et al. | 98/115.2 |

OTHER PUBLICATIONS

"Boosting Capacities with Chemicals", Loucks, C. M., Feb. 26, 1973, Chemical Engineering, pp. 79–84.

Primary Examiner—Asok Pal
Assistant Examiner—Ourmaed S. Ojan
Attorney, Agent, or Firm—Harness, Dickey & Pierce

[57] ABSTRACT

Method for cleaning the floor and sub-floor region of a paint spray booth by flooding with a cleaning solution and allowing the cleaning solution to soak on the various structures for a preselected period of time. The drains, scrubber section, and conveyor openings of the floor and sub-floor region must be blocked off to prevent the cleaning solution from exiting the booth. This method does not require the manual cleaning of the floor and sub-floor region thereby saving labor costs.

4 Claims, 2 Drawing Sheets

CLEANING ARRANGEMENT AND METHOD FOR PAINT SPRAY BOOTH

BACKGROUND OF THE INVENTION

1. Field of the Invention

The present invention generally relates to paint spray booths and more particularly is concerned with a method for automatically cleaning the floor and sub-floor regions of the booth.

Mass produced products such as automobiles are usually painted in spray booths where the parts are conveyed serially through the booth, and paint is applied either manually or by using robotics. The booths are usually quite long and narrow and totally enclosed except for the openings where the parts enter and exit the booth. Because of common problems associated with spray painting, the booths are usually built with some unique characteristics.

One problem is that a large percentage of the paint never reaches the part being painted but appears as overspray in the air. The overspray must be removed from the booth so that it will not fall back on the painted part or the interior of the booth. To remove the overspray from the air, many booths are provided with a vertical, laminar air flow which is pumped into the booth through a perforated ceiling and passes down through a perforated floor. This creates a constant draft which carries the overspray beneath the floor and into a sub-floor where, in many conventional systems, the overspray in the draft mixes with a cleaning agent, such as water, and the agent carrying the overspray is then removed from the sub-floor to be disposed of properly. Federal law regulates the emissions from paint spray booths in order to prevent a large concentration of paint particles in the air exhausted to the environment. With this in mind it becomes apparent that the booth must be kept clean and the overspray removal process must be maintained in good working order.

Today, it is common for paint spray booths to have a sub-floor region beneath a perforated floor, usually steel grating, wherein the paint overspray particles are removed from the draft. This removal process takes place in a scrubber section which is a part of the sub-floor. As the overspray particles are removed from the draft, by mixing with water in the sub-floor scrubber section, a sludge will start to build up on the sub-floor structures. The paint particles will also make the floor sticky and the particles will tend to obstruct the air flow through the perforated floor. While the paint spray booth is not in use the floor and sub-floor must be cleaned of this sludge build-up and paint overspray. In the past, the floor grating was removed manually from the paint booth and cleaned by dipping the grating sections into a liquid bath, letting them soak and then replacing them in the booth. Having to continually remove and replace the grating became cumbersome and has been replaced with what is in use today.

Presently, high pressure jets of water are applied to the floor grating and the sub-floor structure to remove overspray and paint sludge. It can take many hours to clean the floor grating and sub-floor structure using this method because production booths can be hundreds of feet long. Cleaning is normally done manually during the night shift or on weekends resulting in very high costs.

Consequently, a need exists to improve the method by which the floor and sub floor structure of a paint spray booth are cleaned. A method is needed that will not require manual operation; that will take less time than a manual operation; that will operate within the confines of a typical paint spray booth structure; and a method that will not require a large capital investment.

SUMMARY OF THE INVENTION

The present invention provides a method designed to satisfy one or more of the aforementioned objectives. In accordance with the teachings of this invention, a cleaning method is provided for cleaning the floor and sub-floor structures of a paint spray booth by flooding the floor and sub-floor area with a cleaning solution and letting the fluid soak on the structures, thereby removing paint matter from them, then draining the cleaning solution from the booth to a proper receptacle.

By flooding the floor and sub-floor structure of the booth and letting the cleaning solution soak onto the various parts, the parts will become clean without any manual intervention. Depending upon the strength of the cleaning solution used, the cleaning process of this invention could be much faster than manual methods. The present invention could use the existing draining and piping systems already in place in the sub-floor region of the booth. Therefore, no new expense would be necessary to pump the cleaning solution into the booth or to drain it from the booth. However, it may be prudent to install a separate piping system just for the cleaning solution depending on how caustic the cleaning solution is. The only additional equipment necessary for the cleaning process of this invention are covers for all of the drains, the scrubber unit, and the conveyor apparatus which will prevent the cleaning solution from escaping the floor and sub-floor regions until a sufficient time has elapsed.

BRIEF DESCRIPTION OF THE DRAWINGS

The objects and features of the invention will become apparent from a reading of the detailed description of a preferred embodiment, taken in conjunction with the drawings, in which.

DESCRIPTION OF THE PREFERRED EMBODIMENT

Figure 1:
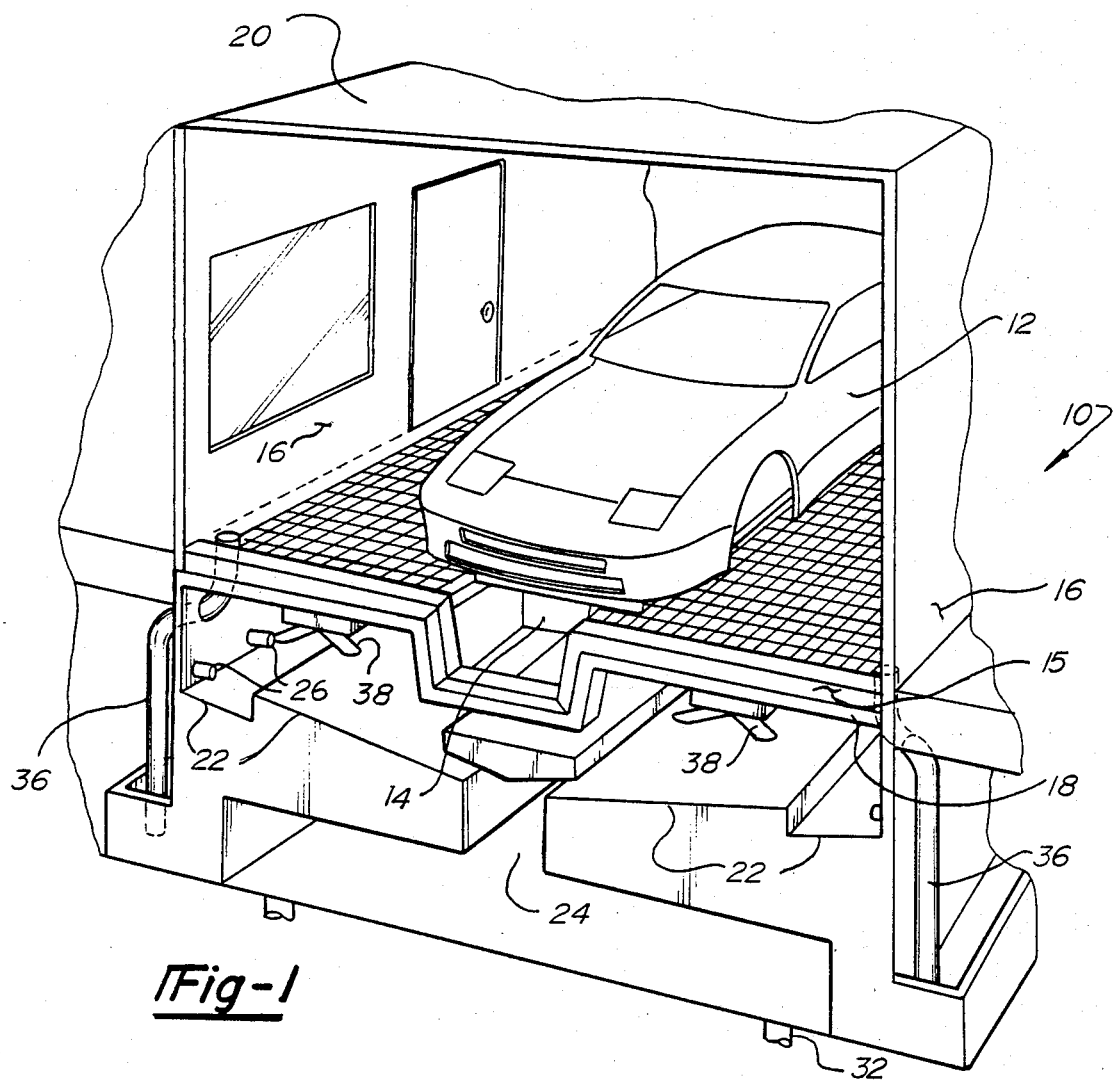
FIG. 1. is a perspective view of a paint spray booth work station showing the floor and sub-floor structure.

Referring now to the drawings, various views of a paint spray booth 10 are shown for purposes of illustration only. One skilled in the art will readily recognize, however, that the principles of the present invention are equally applicable to surface treatment plants other than that shown in the drawings. FIG. 1 illustrates one exemplary embodiment of a paint spray booth 10 for applying paint to vehicle bodies 12 passing through on a conveyor mechanism 14. The booth 10 includes sidewalls 16 and a perforate floor 18 which could be made of a steel grating. The ceiling 20 in the booth might also be perforated and could be made of the same material as the floor 18 or a lower strength wire mesh. A sub-floor structure 22 is also shown which is where the overspray particles are removed from the air by passing through a scrubber system 24.

Air is forced through the ceiling 20 down through the work station and passes through the perforated floor 18 taking overspray paint particles along with it. As the overspray passes through the floor 18 paint particles will begin to build up on the floor 18 and sub-floor steel 22. Once in the scrubber region 24 the air mixes with water which is pumped into the scrubber 24 through the piping system 26 as shown, and the water collects most of the paint particles from the air. During this process the water becomes thickened and in some cases forms sludge which will come to rest on the structure in the sub floor region 22. Most of the water will drain from the sub-floor region 22 where it will be cleaned and the clean water will then be pumped back into the scrubber area 24 to be reused, while the paint particles will be pumped to a suitable receptacle for disposal. After the air is cleaned in the scrubber system 24, it is exhausted to the atmosphere or it can be recycled back through the ceiling 20 to be used again.

Figure 2:
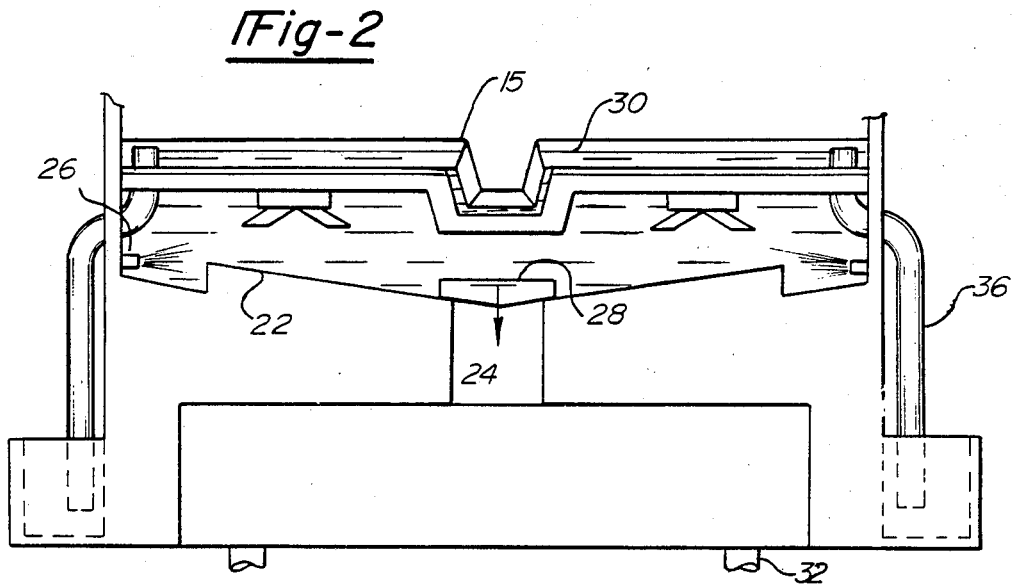
FIG. 2. is a section view of the floor and sub-floor structure of a paint spray booth flooded with a cleaning solution by using existing piping with the paint overspray scrubber blocked off.

FIG. 2 shows the method of the present invention. During down time periods of the painting process the present invention can be used to clean the floor 18 and sub-floor regions 22 of the booth 10. Using the piping 26 already in place, a cleaning solution 30 can be pumped into the sub-floor region 22 to a level that will rise above the perforated floor 18 but preferably not more than one-half inch above the perforated floor 18. Before this is done, however, any drains 32 must be covered, and the scrubber system 24 must be blocked off. This may be accomplished using a number of different devices which will seal these openings so that the cleaning solution 30 cannot escape. A typical blocking device 28 for the scrubber system 24 might be a steel baffle 28 as shown in FIGS. 1–4. This baffle 28 could be raised and lowered manually using a counterweight arrangement or by pneumatics or hydraulics. The conveyor apparatus 14 must also be covered, especially at the entrance and exit to the booth 10, to prevent the cleaning solution 30 from escaping through these openings. A shroud 15 as shown in FIGS. 1–4 would serve this purpose. The shroud 15 could be made of sheet metal and formed to fit any entrance and exit of a booth 10. Once all the drains 32 and openings are sealed, the cleaning solution 30 may be allowed to enter the sub-floor region 22 and fill the sub-floor region 22 until the cleaning solution 30 rises through the perforated floor 18 and throughly covers it. Then the cleaning solution 30 should be allowed to soak on the various structures 18, 22 for a period of time to enable them to become clean from the paint particles and sludge. Depending upon the cleaning solution 30 used the time needed for soaking will vary. For the present invention a cleaning solution 30 having an acid content would conceivably take about two hours to clean the paint particles from the structures 18, 22 by soaking. Of course, other cleaning solutions 30 could be used which would accomplish the same objective.

Figure 3:
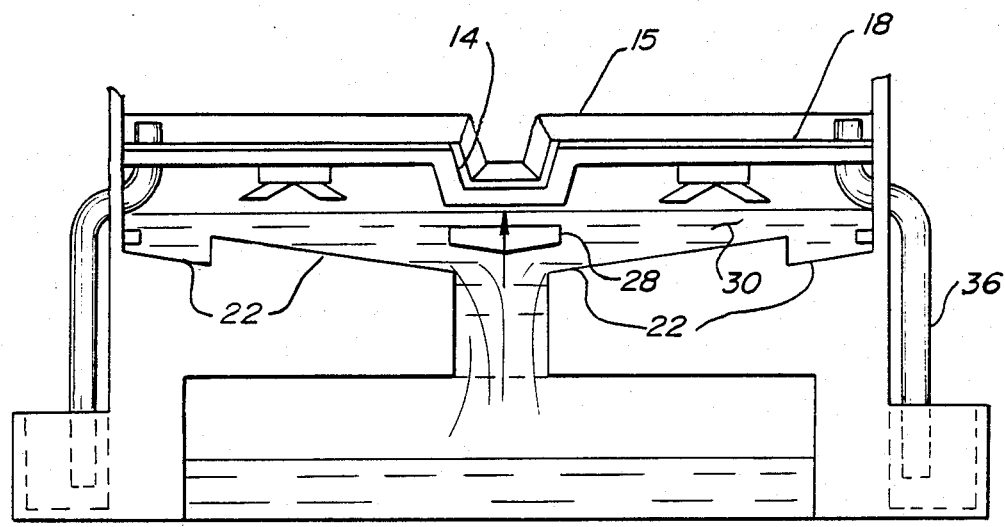
FIG. 3. is a section view of the floor and sub-floor structure of a paint spray booth showing the cleaning solution entering the paint overspray scrubber.

Once the soaking process is finished, the blocking device 28 over the scrubber system 24 can be removed to allow the cleaning solution 30 to enter the scrubber system 24 itself as shown in FIG. 3. Removing the blocking device 28 from the scrubber system 24 with the booth 10 still flooded with the cleaning solution 30 will require some means for doing such, either by remote control electro-mechanical means or by simply having a tool which a person could use to reach through the perforated floor 18 and lift the blocking device 28 from the top of the scrubber system 24. After all parts are clean the drain covers can be removed and the fluid 30 allowed to drain from the sub-floor region 22 to a proper receptacle for disposal.

To ensure that the cleaning solution 30 does not rise too high above the floor 18 one or more standpipes 36 can be installed so that their tops are preferably no higher than one-half inch off of the floor. These standpipes 36 could be allowed to drain to the available disposal receptacle.

Figure 4:
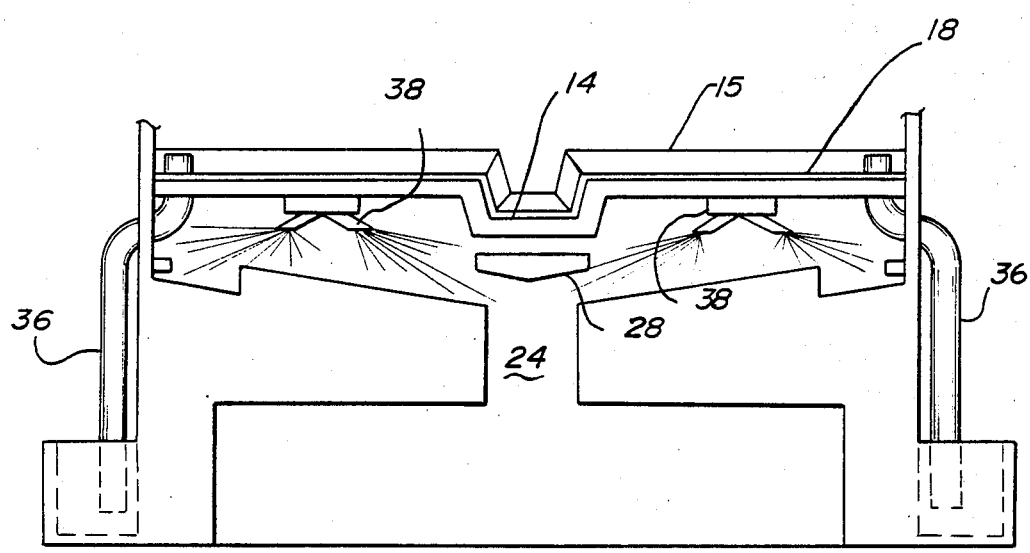
FIG. 4 is a section view of the floor and sub-floor structure of a paint spray booth showing the cleaning solution entering the booth through piping installed exclusively for the cleaning solution.

The cleaning solution 30 could be pumped into the paint booth 10 through a piping system 38 of its own created just for the cleaning process (as shown in FIG. 4.) and could drain from a drainage system installed just for the cleaning process. This may be needed depending upon the properties of the particular cleaning solution 30 which will be used. If there are no foreseen problems with transporting the cleaning solution 30 through the present piping 26 and drainage systems already in place to handle water then these systems should be used.

It is believed that the paint spray booth 10 and the method of the present invention and many of its attendant advantages will be understood from the foregoing description and it will be apparent that various changes may be made in the form and construction of the parts thereof without departing from the spirit and scope of the invention, the form described being merely a preferred or exemplary embodiment thereof.

What is claimed is:

1. A method for cleaning a perforate floor and a sub-floor structure overlying a paint overspray scrubber of a paint spray booth enclosure comprising the steps of:
   blocking any drains and openings near the floor of the booth;
   blocking off the paint overspray scrubber with a blocking device to isolate the scrubber from the perforate floor and the subfloor structure;
   injecting a cleaning solution into the booth to flood the floor and sub-floor structure with the cleaning solution;
   allowing the cleaning solution to soak on the floor and sub-floor structure for a period of time sufficient to produce a self-cleaning effect thereon;
   removing the blocking device from the paint overspray scrubber and allowing the cleaning solution to drain into the scrubber so that the scrubber itself may be cleaned; and
   draining the cleaning solution and any accompanying overspray matter removed by the self-cleaning effect from the booth by unblocking the drains near the floor of the booth.

2. The method of claim 1 in which the step of injecting a cleaning solution further comprises:
   injecting the cleaning solution into the booth using an existing piping system within the booth.

3. The method of claim 1 in which the step of injecting a cleaning solution further comprises:
   injecting the cleaning solution into the booth using a separate piping system dedicated to handling the cleaning solution.

4. The method of claim 1 which further comprises:
   placing at least one standpipe in the booth such that an open inlet of the standpipe extends a predetermined distance above the perforate floor thereby limiting an extent to which the cleaning solution can rise above the perforate floor.

* * * * *